(12) United States Patent
Hyodo et al.

(10) Patent No.: US 7,274,400 B2
(45) Date of Patent: Sep. 25, 2007

(54) DIGITAL CAMERA AND COMPOSITION ASSIST FRAME SELECTING METHOD FOR DIGITAL CAMERA

(75) Inventors: Manabu Hyodo, Asaka (JP); Yoshiharu Gotanda, Asaka (JP)

(73) Assignee: Fujifilm Corporation, Tokyo (JP)

( * ) Notice: Subject to any disclaimer, the term of this patent is extended or adjusted under 35 U.S.C. 154(b) by 655 days.

(21) Appl. No.: 09/768,629

(22) Filed: Jan. 25, 2001

(65) Prior Publication Data

US 2003/0206240 A1 Nov. 6, 2003

(30) Foreign Application Priority Data

Jan. 28, 2000 (JP) ............... 2000-020355

(51) Int. Cl.
*H04N 5/222* (2006.01)
(52) U.S. Cl. .................................. 348/333.02
(58) Field of Classification Search ........... 348/333.01, 348/333.02, 333.03, 333.04, 333.05, 333.06, 348/333.07, 333.08, 333.09, 333.1, 333.11, 348/333.12, 333.13, 239, 238, 229.1, 234; 396/296, 374
See application file for complete search history.

(56) References Cited

U.S. PATENT DOCUMENTS

| | | | |
|---|---|---|---|
| 5,499,074 A * | 3/1996 | Ohsawa et al. ............. 396/121 |
| 5,687,408 A * | 11/1997 | Park ........................... 396/271 |
| 5,732,298 A * | 3/1998 | Nishizawa et al. ......... 396/380 |
| 5,873,007 A * | 2/1999 | Ferrada Suarez ........... 396/296 |
| 5,883,666 A * | 3/1999 | Kyuma et al. ........... 348/229.1 |
| 6,219,492 B1 * | 4/2001 | Maehama et al. ............ 396/50 |
| 6,597,817 B1 * | 7/2003 | Silverbrook ................ 382/289 |
| 6,606,117 B1 * | 8/2003 | Windle ....................... 348/239 |
| 6,636,635 B2 * | 10/2003 | Matsugu ..................... 382/218 |
| 6,687,386 B1 * | 2/2004 | Ito et al. .................... 382/103 |
| 6,766,055 B2 * | 7/2004 | Matsugu et al. ............ 382/173 |
| 6,806,906 B1 * | 10/2004 | Soga et al. ............ 348/333.03 |
| 6,912,311 B2 * | 6/2005 | Anderson et al. ........... 382/209 |

OTHER PUBLICATIONS

MX-2900 Zoom Digital Camera Owner's Manual, Jun. 1, 1999, Fujifilm.*

* cited by examiner

*Primary Examiner*—Vivek Srivastava
*Assistant Examiner*—Justin P Misleh
(74) *Attorney, Agent, or Firm*—Birch, Stewart, Kolasch & Birch, LLP

(57) ABSTRACT

A digital camera has a plurality of shooting modes such as a day scenic shooting mode, a night scenic shooting mode and a person shooting mode and displays a composition assist frame selected from a plurality of composition assist frames on a liquid crystal monitor to assist composition. If a user sets the person shooting mode by a mode dial, one or more composition assist frames that are suitable for a person shooting are extracted from the plurality of the composition assist frames, and the user selects one of the extracted composition assist frames by a left key and a right key of a cross key. Therefore, the appropriate composition assist frame can be automatically or easily selected.

18 Claims, 15 Drawing Sheets

AUTOMATIC SHOOTING MODE

F I G. 4
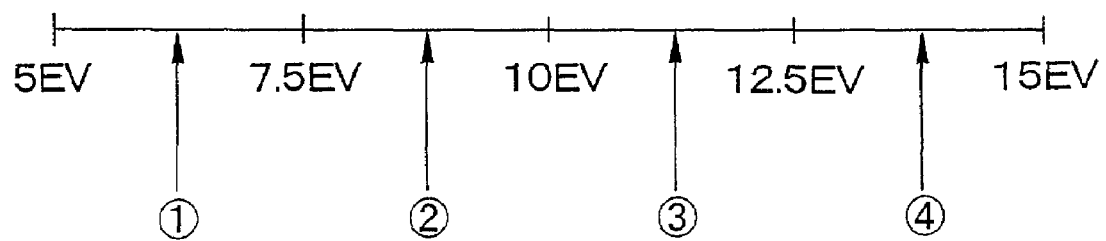

FIG. 5(A)

AUTOMATIC SHOOTING MODE
OR PERSON SHOOTING MODE

| 1 | 1  | 1  | 1  | 1  | 1  | 1  | 1 |
|---|----|----|----|----|----|----|---|
| 1 | 4  | 4  | 4  | 4  | 4  | 4  | 1 |
| 1 | 16 | 32 | 32 | 32 | 32 | 16 | 1 |
| 1 | 16 | 32 | 64 | 64 | 32 | 16 | 1 |
| 1 | 16 | 32 | 64 | 64 | 32 | 16 | 1 |
| 1 | 16 | 32 | 32 | 32 | 32 | 16 | 1 |
| 1 | 4  | 4  | 4  | 4  | 4  | 4  | 1 |
| 1 | 1  | 1  | 1  | 1  | 1  | 1  | 1 |

FIG. 5(B)

DAY SCENIC SHOOTING MODE

| 1 | 3  | 3  | 3  | 3  | 3  | 3  | 1 |
|---|----|----|----|----|----|----|---|
| 2 | 10 | 10 | 10 | 10 | 10 | 10 | 2 |
| 3 | 10 | 10 | 10 | 10 | 10 | 10 | 3 |
| 3 | 10 | 10 | 10 | 10 | 10 | 10 | 3 |
| 3 | 10 | 10 | 10 | 10 | 10 | 10 | 3 |
| 3 | 10 | 10 | 10 | 10 | 10 | 10 | 3 |
| 2 | 10 | 10 | 10 | 10 | 10 | 10 | 2 |
| 1 | 3  | 3  | 3  | 3  | 3  | 3  | 1 |

FIG. 5(C)

NIGHT SCENIC SHOOTING MODE

| 10 | 10 | 10 | 10 | 10 | 10 | 10 | 10 |
|----|----|----|----|----|----|----|----|
| 10 | 10 | 10 | 10 | 10 | 10 | 10 | 10 |
| 10 | 10 | 10 | 10 | 10 | 10 | 10 | 10 |
| 10 | 10 | 10 | 10 | 10 | 10 | 10 | 10 |
| 10 | 10 | 10 | 10 | 10 | 10 | 10 | 10 |
| 10 | 10 | 10 | 10 | 10 | 10 | 10 | 10 |
| 10 | 10 | 10 | 10 | 10 | 10 | 10 | 10 |
| 10 | 10 | 10 | 10 | 10 | 10 | 10 | 10 |

F I G. 8
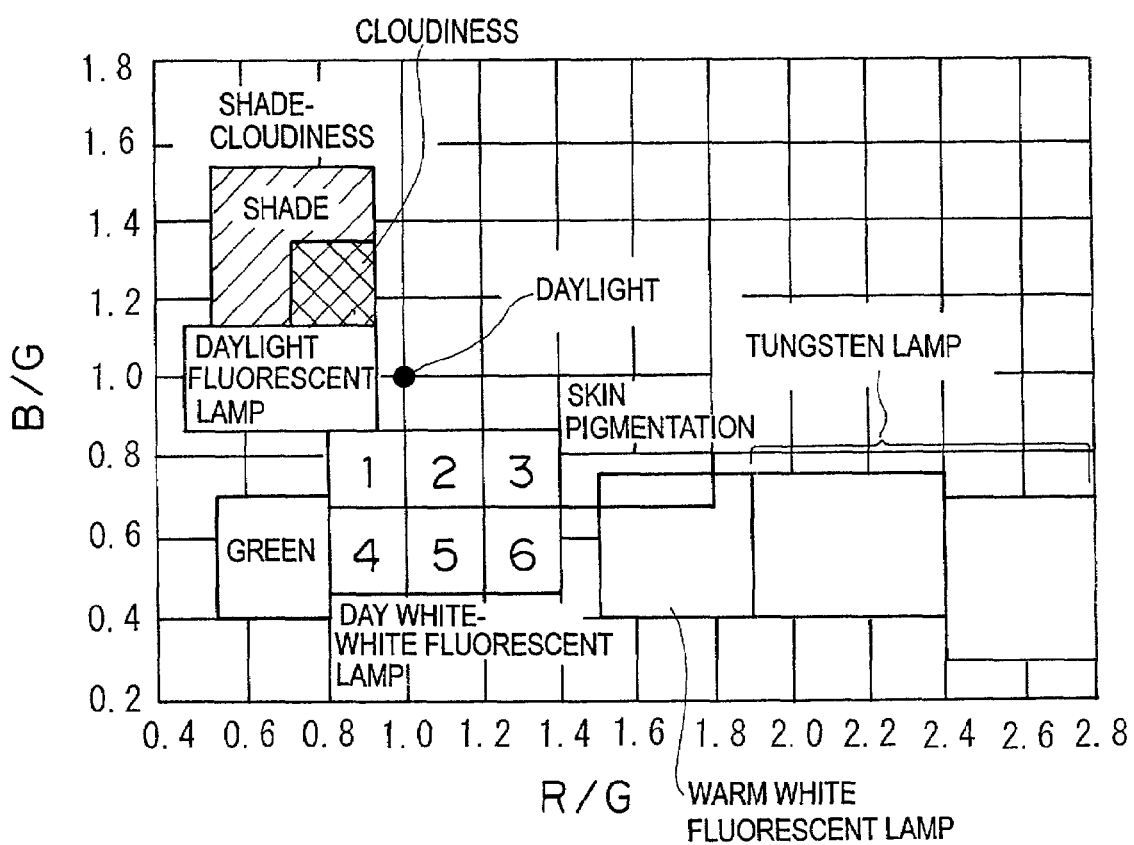

F I G. 9
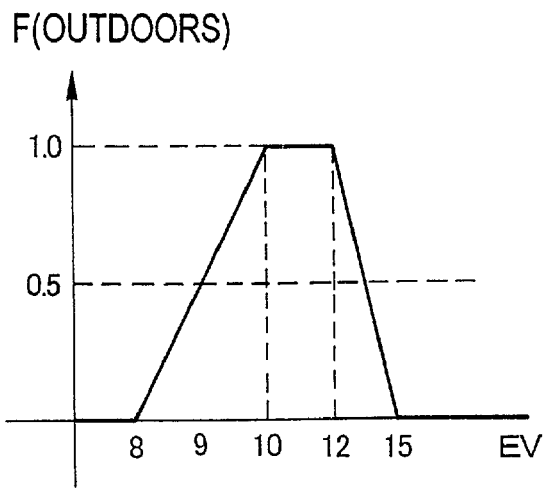
F I G. 10
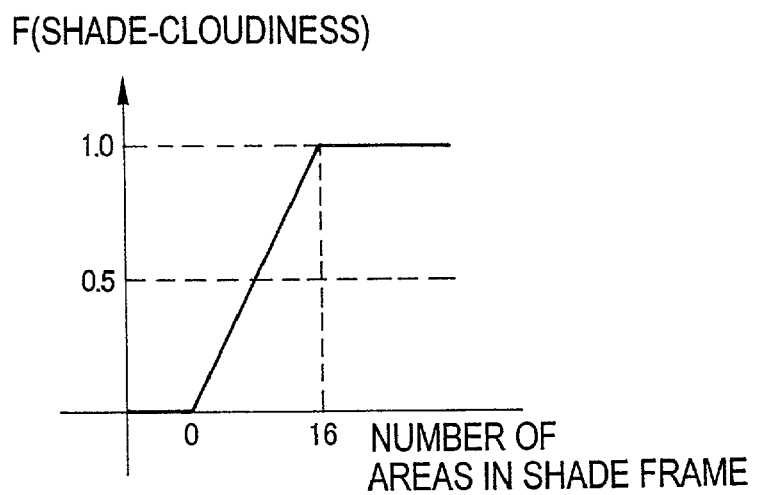
F I G. 11
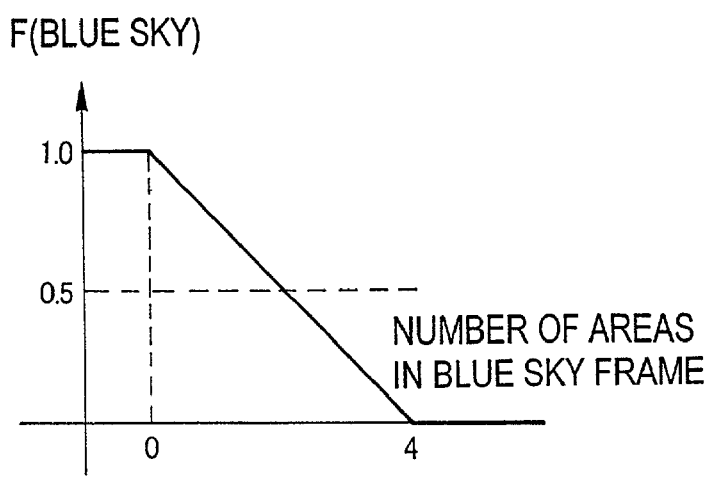

COMPOSITION ASSIST FRAME 1

COMPOSITION ASSIST FRAME 2

COMPOSITION ASSIST FRAME 3

COMPOSITION ASSIST FRAME 4

COMPOSITION ASSIST FRAME 5

COMPOSITION ASSIST FRAME 6

DAY SCENIC SHOOTING MODE

AUTOMATIC SHOOTING MODE

PERSON SHOOTING MODE

DIGITAL CAMERA AND COMPOSITION ASSIST FRAME SELECTING METHOD FOR DIGITAL CAMERA

BACKGROUND OF THE INVENTION

1. Field of the Invention

The present invention relates generally to a digital camera and a composition assist frame selecting method for the digital camera. The present invention relates more particularly to a digital camera that has multiple shooting modes and a composition assist frame selecting method for the digital camera.

2. Description of Related Art

In recent years, a digital camera with the best framing function has been proposed. In the best framing function, one of composition assist frames is displayed on a liquid crystal monitor with an image so that even a novice can compose an excellent image.

The composition assist frames are a lattice frame, a frame for shooting two persons, a frame for shooting one person, and so on. One of the composition assist frames is displayed on the liquid crystal monitor when the user presses a display button, and the composition assist frames are sequentially displayed when the user repeatedly presses a multifunction cross key.

However, it is troublesome to select the desired composition assist frame from the composition assist frames. Especially, if the number of the composition assist frames are large, it takes a long time to select the desired composition assist frame, and the user can miss an opportunity for a photograph.

SUMMARY OF THE INVENTION

In view of the foregoing, it is an object of the present invention to provide a digital camera and a composition assist frame selecting method for the digital camera in which a desired composition assist frame can be automatically or easily selected from a plurality of composition assist frames.

To achieve the above-mentioned object, the present invention is directed to a composition assist frame selecting method for a digital camera that images a subject in a shooting mode selected from a plurality of shooting modes and displays a composition assist frame selected from a plurality of composition assist frames on an image displaying device that displays the image of the subject to assist composition, wherein: the digital camera extracts at least one composition assist frame that can be selected from the plurality of composition assist frames according to the shooting mode.

The present invention is also directed to a composition assist frame selecting method for a digital camera that displays a composition assist frame selected from a plurality of composition assist frames on an image displaying device that displays an image of a subject to assist composition, wherein: the digital camera has a direction determining device that determines whether the digital camera is held widthwise or lengthwise; and the digital camera extracts at least one composition assist frame that can be selected from the plurality of composition assist frames according to the direction of the camera determined by the direction determining device.

The present invention is also directed to a composition assist frame selecting method for a digital camera that images a subject in a shooting mode selected from a plurality of shooting modes and displays a composition assist frame selected from a plurality of composition assist frames on an image displaying device that displays the image of the subject to assist composition, wherein: the digital camera has a direction determining device that determines whether the digital camera is held widthwise or lengthwise; and the digital camera extracts at least one composition assist frame that can be selected from the plurality of composition assist frames according to the shooting mode and the direction of the camera determined by the direction determining device.

The plurality of shooting modes include at least two of an automatic shooting mode, a day scenic shooting mode, a person shooting mode and a night scenic shooting mode.

If the day scenic shooting mode or the night scenic shooting mode is set, frames that are suitable for shooting a day scene or a night scene are extracted. If the person shooting mode is set, frames that are suitable for shooting one or more persons are extracted. If the user holds the camera widthwise, frames that are suitable for a shooting in that direction are extracted. If the user holds the camera lengthwise, frames that are suitable for a shooting in that direction are extracted.

The composition assist frames are extracted from the plurality of composition assist frames according to the shooting mode and the direction of the camera. Therefore, the appropriate composition frame can be automatically or easily selected.

The present invention is also directed to a digital camera comprising: a shooting mode selecting device that selects a shooting mode from a plurality of shooting modes; an imaging device that images a subject in the shooting mode selected by the shooting mode selecting device and outputs image signals; an image displaying device that displays the image according to the image signals outputted from the imaging device; a storing device that stores data of a plurality of composition assist frames; an extracting device that extracts one or more composition assist frames that can be selected from the plurality of composition assist frames according to the shooting mode selected by the shooting mode selecting device; a composition assist frame selecting device that selects a composition assist frame from the composition assist frames extracted by the extracting device; and a composition assist frame displaying device that displays the composition assist frame selected by the composition assist frame selecting device on the image displaying device displaying the image.

The present invention is also directed to a digital camera comprising: an imaging device that images a subject and outputs image signals; an image displaying device that displays the image according to the image signals outputted from the imaging device; a storing device that stores data of a plurality of composition assist frames; a direction determining device that determines whether the digital camera is held widthwise or lengthwise; an extracting device that extracts one or more composition assist frames that can be selected from the plurality of composition assist frames according to the direction of the camera determined by the direction determining device; a composition assist frame selecting device that selects a composition assist frame from the composition assist frames extracted by the extracting device; and a composition assist frame displaying device that displays the composition assist frame selected by the composition assist frame selecting device on the image displaying device displaying the image.

The present invention is also directed to a digital camera comprising: a shooting mode selecting device that selects a shooting mode from a plurality of shooting modes; an imaging device that images a subject in the shooting mode selected by the shooting mode selecting device and outputs image signals; an image displaying device that displays the image according to the image signals outputted from the imaging device; a storing device that stores data of a plurality of composition assist frames; a direction determining device that determines whether the digital camera is held widthwise or lengthwise; an extracting device that extracts one or more composition assist frames that can be selected from the plurality of composition assist frames according to the shooting mode selected by the shooting mode selecting device and the direction of the camera determined by the direction determining device; a composition assist frame selecting device that selects a composition assist frame from the composition assist frames extracted by the extracting device; and a composition assist frame displaying device that displays the composition assist frame selected by the composition assist frame selecting device on the image displaying device displaying the image.

The plurality of shooting modes include at least two of an automatic shooting mode, a day scenic shooting mode, a person shooting mode and a night scenic shooting mode.

The digital camera further comprises a luminance determining device that determines subject luminance by weighting areas of the image according to the shooting mode selected by the shooting mode selecting device, and the imaging device controls exposure according to the subject luminance determined by the luminance determining device.

The luminance determining device corrects the subject luminance according to the shooting mode selected by the shooting mode selecting device.

The digital camera further comprises a storage device that stores the image signals outputted from the imaging device in a storage medium.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 4 is an explanatory drawing showing the method of calculating exposure values;

FIGS. 5(A), 5(B) and 5(C) are tables showing weight coefficients of areas for shooting modes;

FIG. 8 is a graph diagram showing ranges of determination frames for light sources;

FIG. 9 is a graph diagram of a membership function indicating possibility of outdoors;

FIG. 10 is a graph diagram of a membership function indicating possibility of shade-cloudiness;

FIG. 11 is a graph diagram of a membership function indicating possibility of blue sky;

DETAILED DESCRIPTION OF THE PREFERRED EMBODIMENT

This invention will be described in further detail by way of example with reference to the accompanying drawings.

Figure 1:
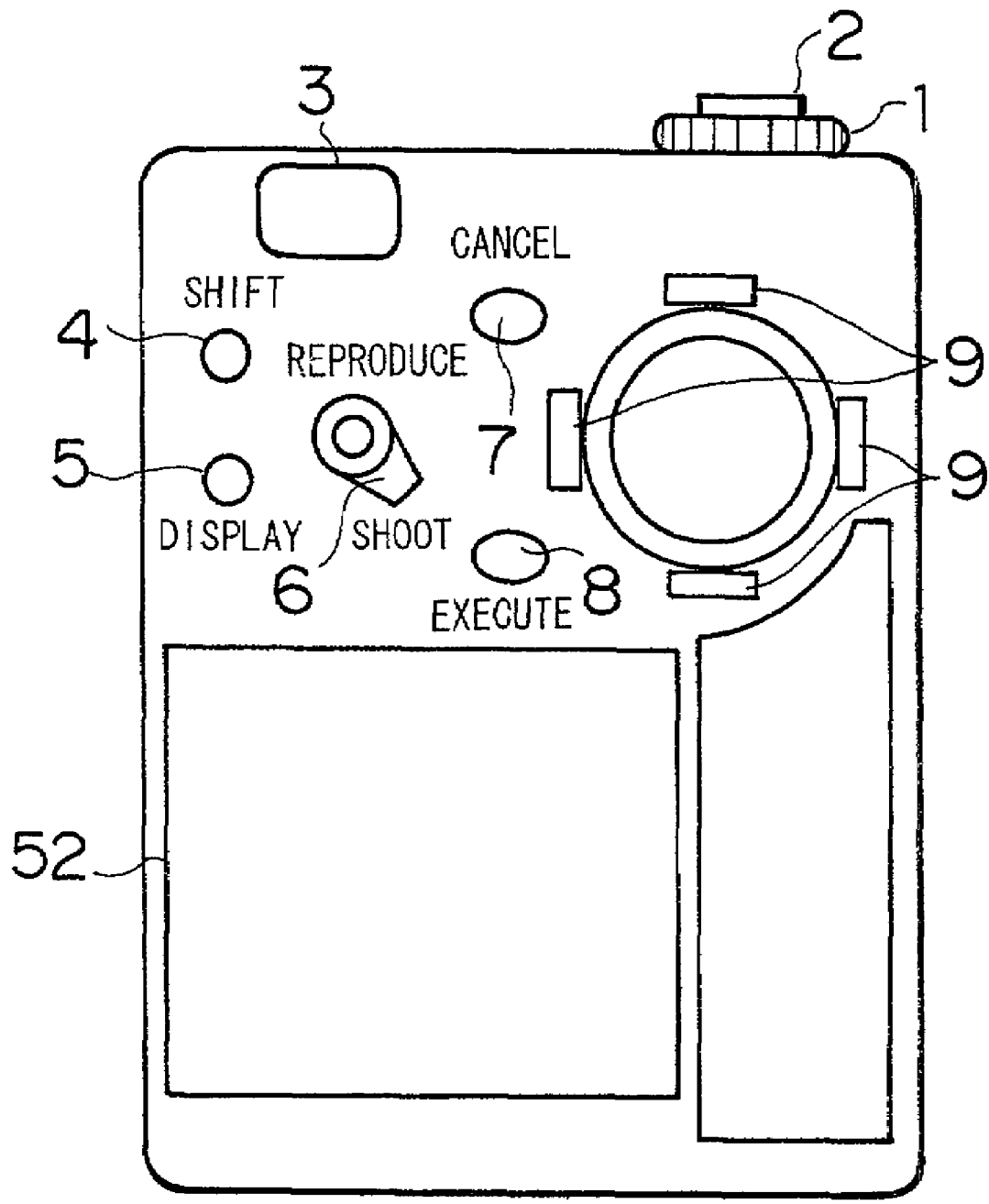
FIG. 1 is a back view of a digital camera according to the present invention.
Figure 2:
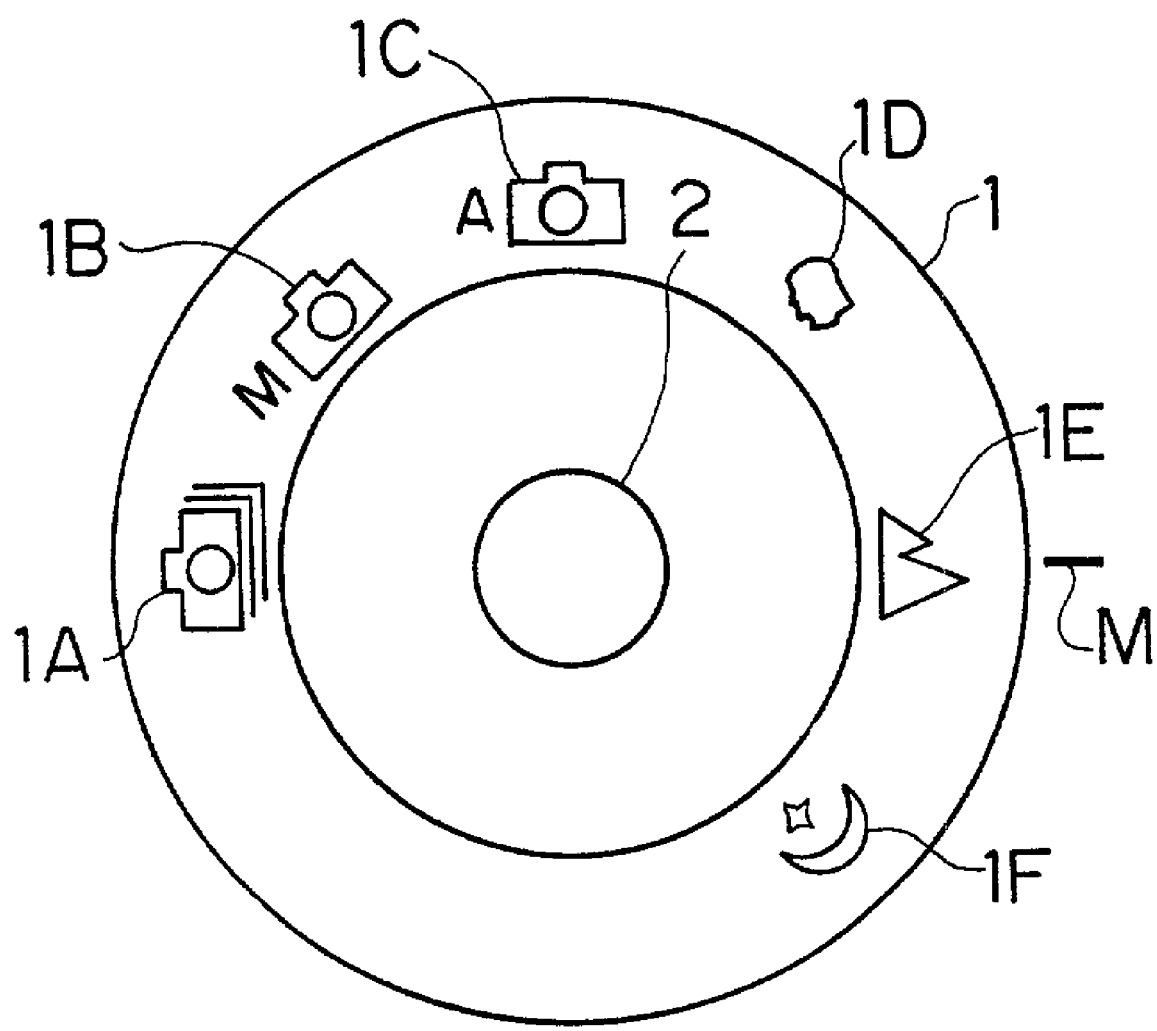
FIG. 2 is a plan view of a mode dial provided on the top of the digital camera in FIG. 1.

FIG. 1 is a back view of a digital camera according to the present invention, and FIG. 2 is a plan view of a mode dial 1 provided on the top of the camera.

As shown in FIG. 2, the mode dial 1 has icons 1A, 1B, 1C, 1D, 1E and 1F for shooting modes that are a sequential shooting/bracketing mode, a manual shooting mode, an automatic shooting mode, a person shooting mode, a day scenic shooting mode and a night scenic shooting mode, respectively. A user rotates the mode dial 1 to set one of the icons 1A-1F at a mark M in order to set the corresponding shooting mode (the day scenic shooting mode in FIG. 2). A shutter release button 2 is provided in the center of the mode dial 1, and the shutter release button 2 can be pressed half and fully.

As shown in FIG. 1, an eyepiece 3, a shift key 4, a display key 5, a shooting/reproducing switch 6, a cancel key 7, an execution key 8, a multifunction cross key 9 and a liquid crystal monitor 52 are provided on the back of the digital camera.

Figure 3:
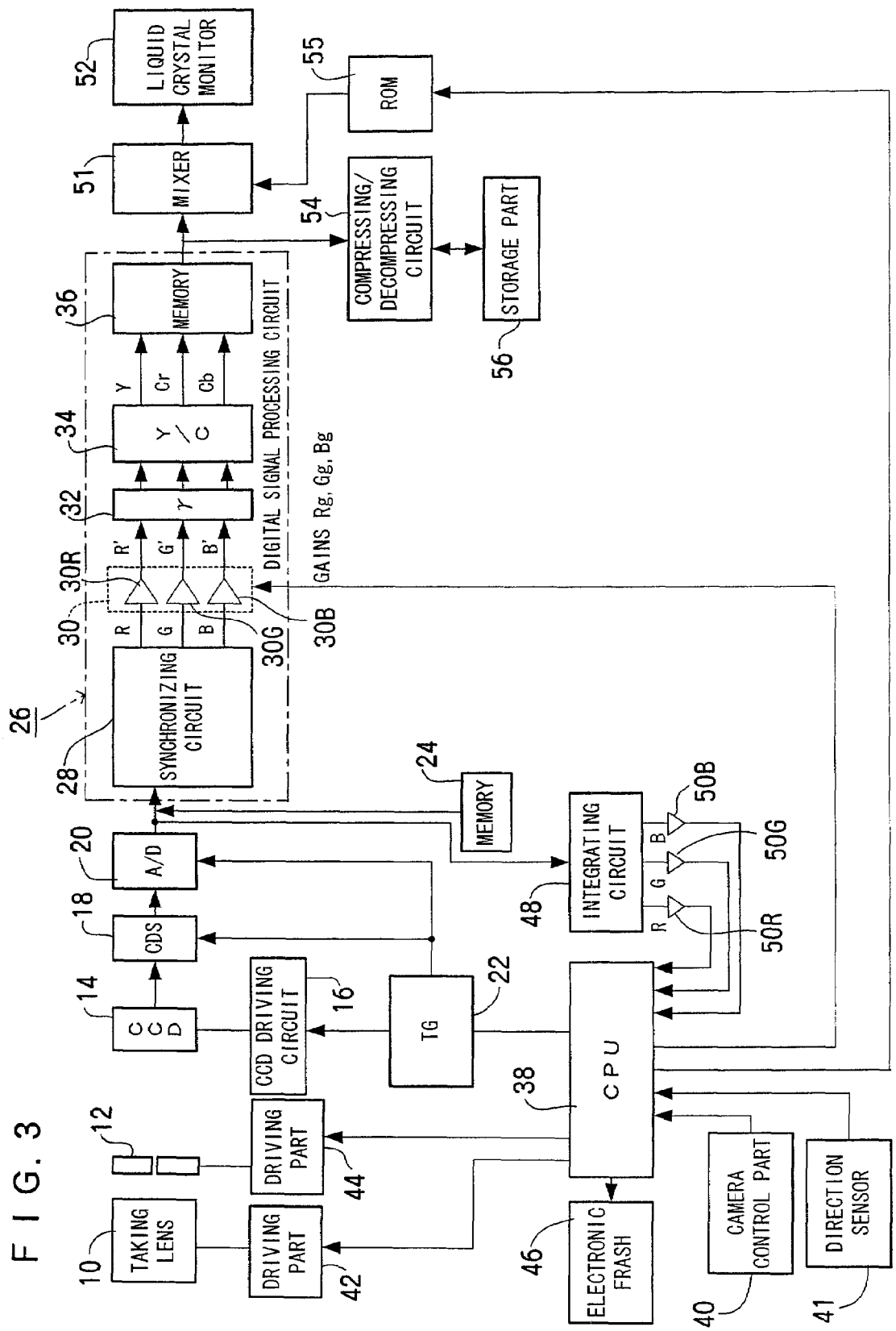
FIG. 3 is a block diagram showing the inner structure of the digital camera in FIG. 1.

FIG. 3 is a block diagram showing the inner structure of the digital camera in FIG. 1.

A subject image formed on a light-receiving surface of a charge coupled device (CCD) 14 through a taking lens 10 and a diaphragm 12 is converted into signal electric charges corresponding to the amount of an incident light by each sensor. The stored signal electric charges are read out to shift registers with read gate pulses applied from a CCD driving circuit 16, and sequentially read out as voltage signals corresponding to the signal electric charges with register transfer pulses. The CCD 14 has an electric shutter function for controlling the exposure time (shutter speed) by outputting the stored signal electric charges with shutter gate pulses.

The voltage signals are outputted from the CCD 14 to a correlative double sampling circuit (CDS circuit) 18, which samples and holds R, G and B signals of each pixel. The CDS circuit 18 outputs the R, G and B signals to an A/D converter 20, which converts the R, G and B signals into 10-bit digital R, G and B signals (0-1023) and outputs the digital R, G and B signals. The CCD driving circuit 16, the CDS circuit 18 and the A/D converter 20 are synchronized by timing signals outputted from a timing generator 22.

The digital R, G and B signals outputted from the A/D converter 20 are temporarily stored in a memory 24, and then outputted to a digital signal processing circuit 26. The digital signal processing circuit 26 comprises a synchronizing circuit 28, a white balance adjusting circuit 30, a gamma correcting circuit 32, a YC signal producing circuit 34 and a memory 36.

The synchronizing circuit 28 converts the dot-sequential R, G and B signals read from the memory 24 into synchronous R, G and B signals, which are outputted to the white balance adjusting circuit 30. The white balance adjusting circuit 30 has multipliers 30R, 30G and 30B that increases or decreases digital values of the R, G and B signals, and the R, G and B signals are inputted to the multipliers 30R, 30G and 30B, respectively. White balance correction values (gains) Rg, Gg and Bg for adjusting the white balance are outputted from a central processing unit (CPU) 38 to the multipliers 30R, 30G and 30B, respectively. Each of the multipliers 30R, 30G and 30B multiplies the corresponding digital value and gain together, and the multipliers 30R, 30G and 30B get R', G' and B' signals. The white balance adjusting circuit 30 outputs the R', G' and B' signals to the gamma correcting circuit 32. The gains Rg, Gg and Bg will be later explained in detail.

The gamma correcting circuit 32 corrects the 10-bit R', G' and B' signals to 8-bit R, G and B signals with desired gamma characteristic and outputs the R, G and B signals to the YC signal producing circuit 34. The YC signal producing circuit 34 produces luminance signals Y and chroma signals Cr and Cb (YC signals) from the R, G and B signals. The YC signals are stored in the memory 36.

The YC signals are read from the memory 36 and outputted from the liquid crystal monitor 52 through a mixer 51 so that a moving image or a still image is displayed on the liquid crystal monitor 52. After the shooting, the YC signals are compressed with a predetermined format by the compressing/decompressing circuit 54, and the compressed image data is stored in a storage medium such as a memory card by a storage part 56. In the reproducing mode, the image data stored in the memory card or the like is decompressed, and the decompressed image data is outputted to the liquid crystal monitor 52 through the mixer 51 so that the image is displayed on the liquid crystal monitor 52.

The CPU 38 controls the circuits according to inputs from a camera control part 40 including the mode dial 1 and the shutter release button 2 and a direction sensor 41 that determines whether the user holds the camera sideways or upright. The CPU 38 also controls automatic focusing, automatic exposure, automatic white balance and selection of a composition assist frame that assists the composition. For example, the automatic focusing is contrast automatic focusing that moves the taking lens 10 through a driving part 42 so that the high-frequency component of the G signal is the maximum when the shutter release button 2 is half pressed.

In the automatic exposure, the R, G and B signals are read up to four times as shown in FIG. 4, and the subject brightness (exposure values) is determined according to integrated values of the R, G and B signals.

The method of determining the exposure value will now be explained in detail.

The image is divided into multiple areas (8 by 8), and luminance signals found from the R, G and B signals of each area are integrated, and the exposure value (EVi) of each area is found from the integrated value. Then, as shown in FIGS. 5(A), 5(B) and 5(C), weight coefficients of the areas are determined for each shooting mode, and an exposure value EV' of the whole image is calculated by the following equation 1, $$EV'=\log_2\{\Sigma(W_i \times 2^{EV_i})/\Sigma W_i\} \quad \text{equation 1,}$$

wherein i is an area number from 0 to 63 and $W_i$ is the weight coefficient of the area i for each shooting mode.

As shown in FIG. 5(A), in the automatic mode or the person shooting mode, the closer an area is to the center of the image, the larger the weight coefficient is. As shown in FIG. 5(B), in the day scenic shooting mode, the weight coefficients of the peripheral areas are smaller than that of the other areas. As shown in FIG. 5(C), in the night scenic shooting mode, the weight coefficients of all the areas are the same.

Then, the exposure value EV is calculated by the following equation 2, $$EV=EV'-\Delta EV \quad \text{equation 2,}$$

wherein $\Delta EV$ is a correction value for each shooting mode. For example, the correction value $\Delta EV$ is 0 in the person shooting mode, and it is 0.3 in the day scenic mode and the night scenic shooting mode.

The F-number and the shutter speed are determined from the exposure value EV.

When the shutter release button 2 is fully pressed, the CPU 38 drives the diaphragm 12 through a diaphragm driving part 44 for the determined F-number, and controls the exposure time for the determined shutter speed.

The methods of automatically controlling the white balance will now be explained with reference to flowcharts of FIGS. 6 and 7. If an electronic flash 46 emits a light, the gains Rg, Gg and Bg for the light are outputted to the white balance adjusting circuit 30. The case in which the electronic flash 46 does not emit the light will now be explained.

Figure 6:
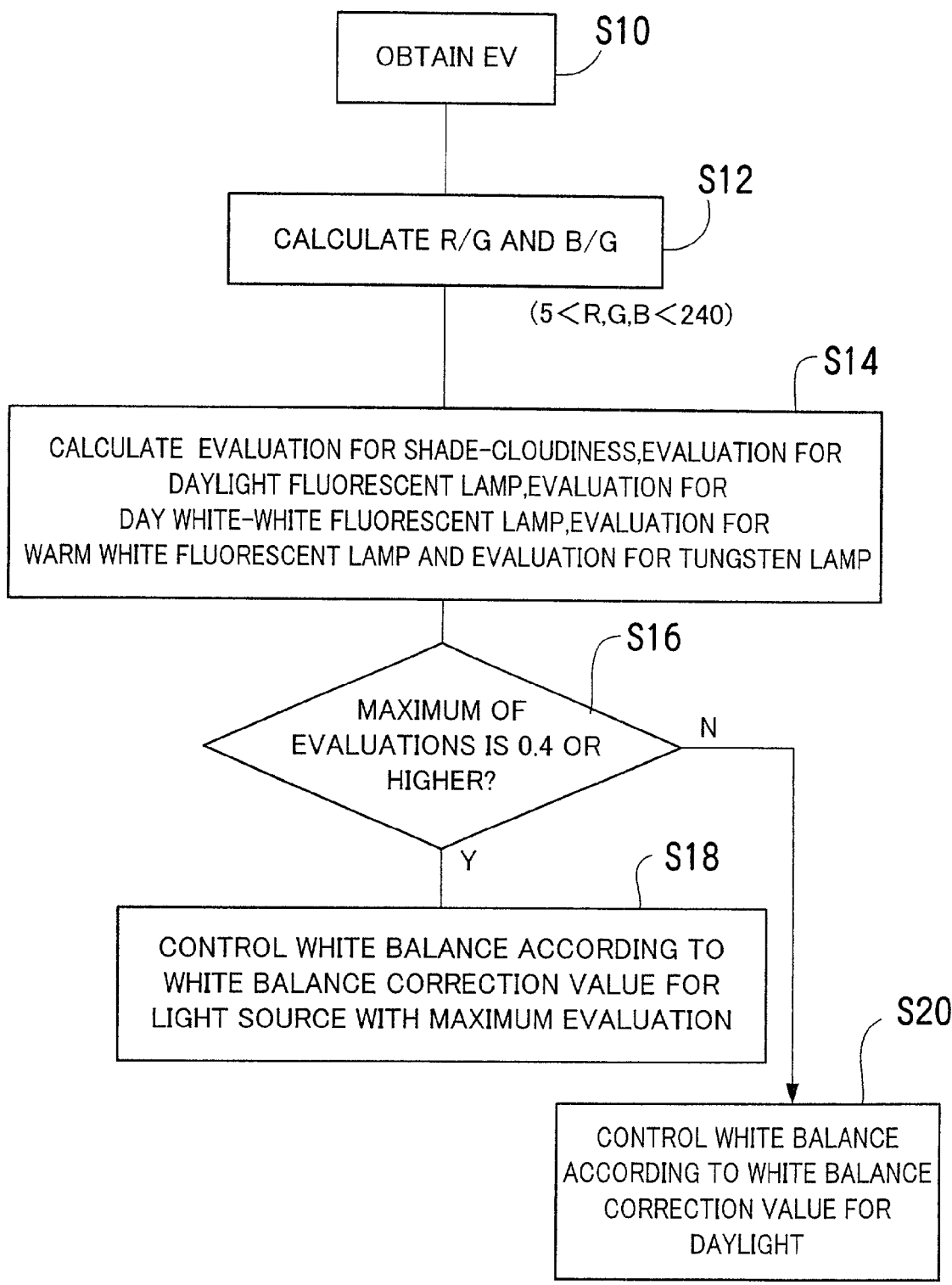
FIG. 6 is a flowchart showing a method of automatically controlling white balance.

FIG. 6 shows the method of automatically controlling the white balance in the automatic mode or the person shooting mode.

First, the exposure value determined when the shutter release button 2 was half pressed is obtained (step 10).

Then, the image is divided into the multiple areas (8 by 8), and the average values of the R, G and B signals in each area stored in the memory 24 when the shutter release button 2 was fully pressed are calculated, and the ratio (R/G) of the average value of the R signals to that of the G signals and the ratio (B/G) of the average value of the B signals to that of the G signals of each area are calculated (step 12).

The ratios R/G and B/G of each area are used to determine which one of determination frames in FIG. 8 includes the area. The determination frames such as a shade-cloudiness frame and a daylight color frame define ranges of the ratios for various types of light sources.

The integrating circuit 48 in FIG. 3 calculates the average values of the R, G and B signals in each area and outputs them to the CPU 38. Multipliers 50R, 50G and 50B are provided between the integrating circuit 48 and the CPU 38, and gains are inputted to the multipliers 50R, 50G and 50B.

Then, an evaluation for shade-cloudiness, evaluations for fluorescent lamps (daylight color, day white-white and warm white) and an evaluation for a tungsten lamp are calculated by the following equations 3, 4, 5, 6 and 7 (step 14), Evaluation for shade-cloudiness $$=F(\text{outdoors}) \times F(\text{shade-cloudiness}) \times F(\text{blue sky}), \quad \text{equation 3}$$

Evaluation for daylight fluorescent lamp $$F_1(\text{indoors}) \times F(\text{daylight fluorescent lamp}), \quad \text{equation 4}$$

Evaluation for day white-white fluorescent lamp $= F_1$(indoors)×$F$(day white-white fluorescent lamp),     equation 5

Evaluation for warm white fluorescent lamp $= F_1$(indoors)×$F$(warm white fluorescent lamp)×$F$(skin),     equation 6 and

Evaluation for tungsten lamp $= F_2$(indoors)×$F$(tungsten lamp)×$F$(skin).     equation 7

F(outdoor) in the equation 3 is a membership function of the exposure value obtained at step 10 as shown in FIG. 9, and it indicates the possibility of the outdoors.

Figure 12:
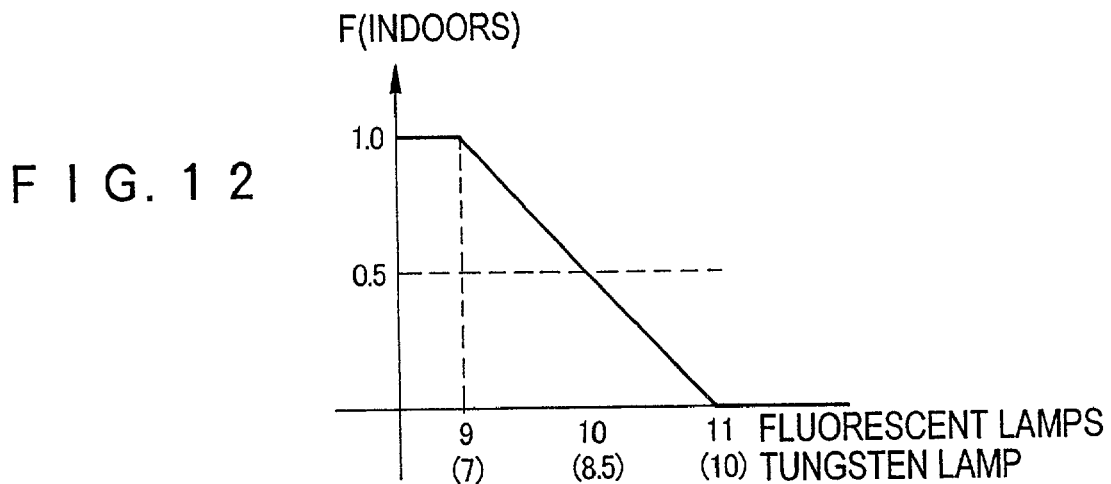
FIG. 12 is a graph diagram of a membership function indicating possibility of indoors.

$F_1$(indoors) in the equations 4, 5 and 6 is a membership function of the exposure value as shown in FIG. 12, and it indicates the possibility of the indoors (the fluorescent lamps). $F_2$(indoors) in the equation 7 is a membership function of the exposure value (values in brackets) as shown in FIG. 12, and it indicates the possibility of the indoors (the tungsten lamp). The exposure values in FIGS. 9 and 12 are values determined with the weight coefficients for the automatic mode and the person shooting mode regardless of the selected shooting mode.

F(shade-cloudiness) in the equation 3 is a membership function of the number of areas whose exposure values are 12 or less and that are in the shade-cloudiness frame as shown in FIG. 10, and it indicates the possibility of the shade-cloudiness. F(blue sky) in the equation 3 is a membership function of the number of areas whose exposure values are larger than 12.5 and that are in an outdoors-clear weather frame as shown in FIG. 11, and it indicates the possibility of blue sky.

The larger the number of the areas for F(blue sky) is, the lower the evaluation for the shade-cloudiness is. The luminance (exposure value Evi) of each area is calculated by the following equation 8, $Evi = Ev + \log_2(Gi/45)$,     equation 8 wherein Ev is the exposure value and Gi is the average value of the G signals of each area. 45 is the appropriate value of the signal after the A/D conversion.

Figure 13:
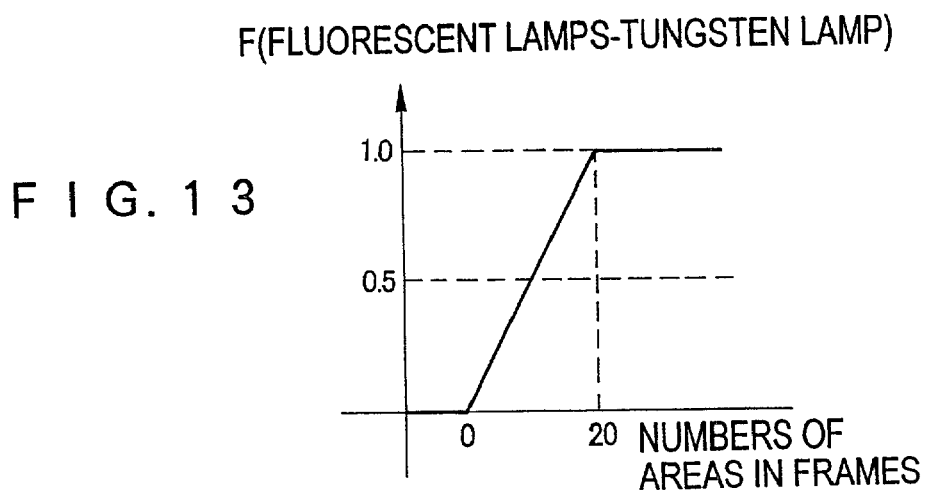
FIG. 13 is a graph diagram of a membership function indicating possibility of a tungsten lamp and fluorescent lamps.

Likewise, F(daylight fluorescent lamp), F(day white-white fluorescent lamp), F(warm white fluorescent lamp) and F(tungsten lamp) in the equations 4, 5, 6 and 7 are membership functions in FIG. 13 of the numbers of areas in the daylight color frame, a day white-white frame, a warm white frame and a tungsten lamp frame in FIG. 8, respectively, and they indicate the possibilities of the fluorescent lamps and the tungsten lamp.

Figure 14:
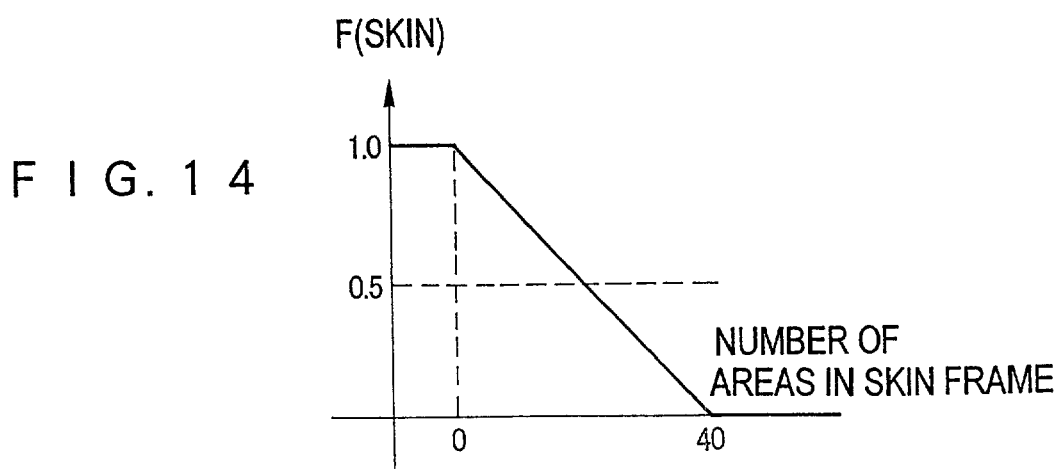
FIG. 14 is a graph diagram of a membership function indicating possibility of skin.

F(skin) in the equations 6 and 7 is a membership function in FIG. 14 of the number of areas in a skin pigmentation frame in FIG. 8. The larger the number of the areas for F(skin) is, the lower the evaluation for the tungsten lamp is. The reason is that redness of skin pigmentation is washed out and people look pale if the white balance is controlled too much for the tungsten lamp.

After the evaluation for the shade-cloudiness, the evaluation for the daylight fluorescent lamp, the evaluation for the day white-white fluorescent lamp, the evaluation for the warm white fluorescent lamp and the evaluation for the tungsten lamp are calculated, whether or not the maximum of the evaluations is 0.4 or higher is determined (step 16 in FIG. 6). If the maximum is 0.4 or higher, the white balance is controlled according to a white balance correction value for the light source with the maximum evaluation (step 18).

If the maximum is lower than 0.4, the white balance is controlled according to a white balance correction value for the daylight (step 20).

The white balance correction value is calculated by the following equation 9,

White balance correction value

=(automatic setting value−1.0)×evaluation+1.0     equation 9.

The automatic setting value is previously set for each light source. The automatic setting values for the shade-cloudiness, the daylight fluorescent lamp, the day white-white fluorescent lamp, the warm white fluorescent lamp and the tungsten lamp are selected in the following ways.

(1) In case of the shade-cloudiness, the number of areas in a cloudiness area in FIG. 8 is compared with the number of areas in the shade area, and the automatic setting value of the frame including more areas is adopted. Alternatively, the automatic setting value of the frame including more areas is weighted to calculate the automatic setting value.

(2) In case of the day white-white fluorescent lamp, the numbers of areas in six frames of the day white-white frame in FIG. 8 are compared, and the automatic setting value of the frame with the largest number of areas is adopted. Alternatively, automatic setting values of the six frames are weighted according to the numbers of the areas to calculate the automatic setting value.

(3) In case of the tungsten lamp, the numbers of areas in two frames of the tungsten lamp frame in FIG. 8 are compared, and the automatic setting value of the frame with more areas is adopted. Alternatively, automatic setting values of the two frames are weighted according to the numbers of the areas to calculate the automatic setting value.

The R, G and B signals are corrected to the R', G' and B' signals calculated by the following equations 10, $R' = Rg \times R$, $G' = Gg \times G$, and $B' = Bg \times B$,     equations 10 wherein Rg, Gg and Bg are the white balance correction values found by the equation 9.

Figure 7:
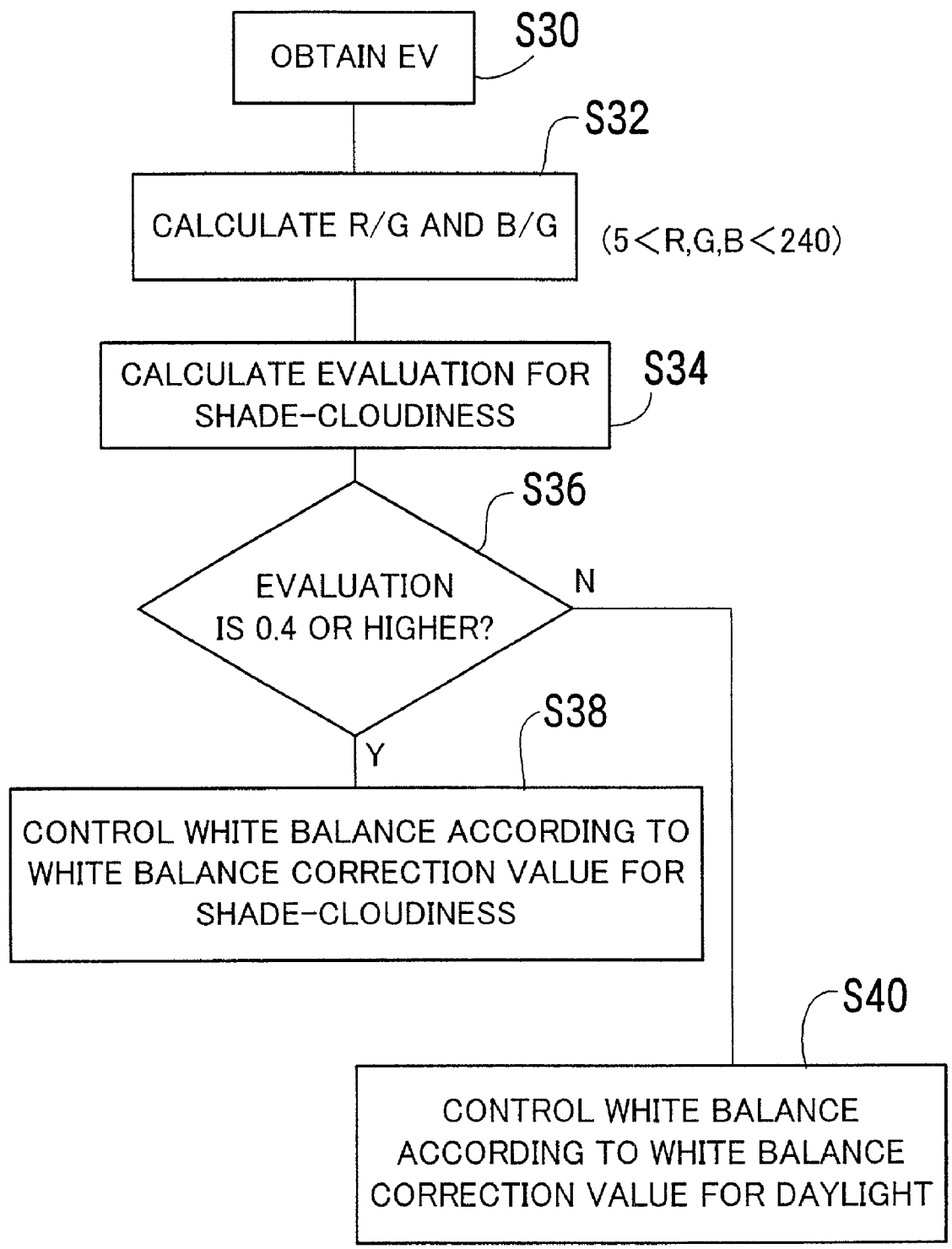
FIG. 7 is a flowchart showing a method of automatically controlling white balance.

FIG. 7 shows the method of automatically controlling the white balance in the day scenic shooting mode. Steps 30 and 32 in FIG. 7 are the same as steps 10 and 12 in FIG. 6, respectively, and they will not be explained.

The evaluation for the shade-cloudiness of the equation 3 is calculated according to the exposure value acquired at step 30 and the ratios R/G and B/G calculated at step 32 (step 34). The evaluations for the fluorescent lamps (daylight color, day white-white and warm white) and the tungsten lamp in step 14 of FIG. 6 are not calculated. This is because the fluorescent lamps and the tungsten lamp are not used when the shooting is performed outdoors in the day scenic shooting mode.

Then, whether or not the evaluation for the shade-cloudiness is 0.4 or higher is determined (step 36). If the evaluation is 0.4 or higher, the white balance correction value is calculated according to the automatic setting value for the shade-cloudiness (see the equation 9), and the white balance is controlled according to the white balance correction value (step 38).

If the evaluation is lower than 0.4, the white balance is controlled according to the white balance correction value for the daylight (step 40).

In case of the night scenic shooting mode, the white balance is not automatically controlled and the white balance correction value for the daylight is adopted. Thus, the white balance control is not affected by artificial light sources.

The method of selecting the composition assist frame for the digital camera according to the present invention will now be explained.

A read only memory (ROM) 55 stores frame data of various composition assist frames for displaying the composition assist frames on the liquid crystal monitor 52.

Figure 15A:
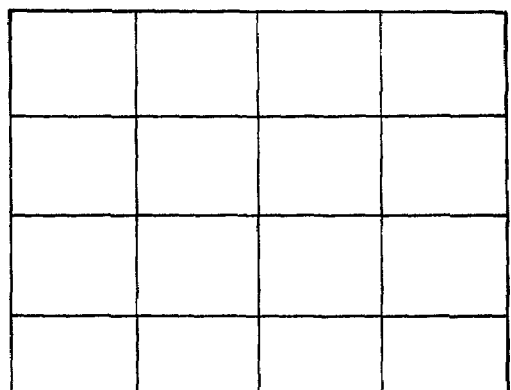
FIGS. 15(A), 15(B), 15(C), 15(D), 15(E) and 15(F) are diagrams showing composition assist frames.
Figure 15B:
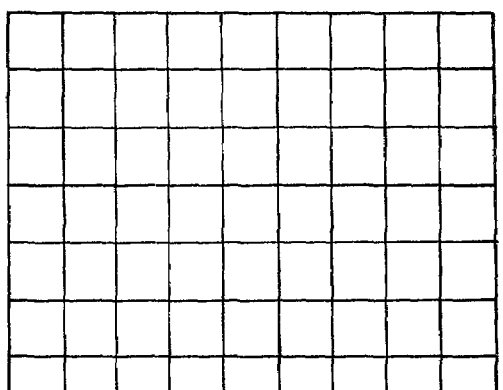
Figure 15C:
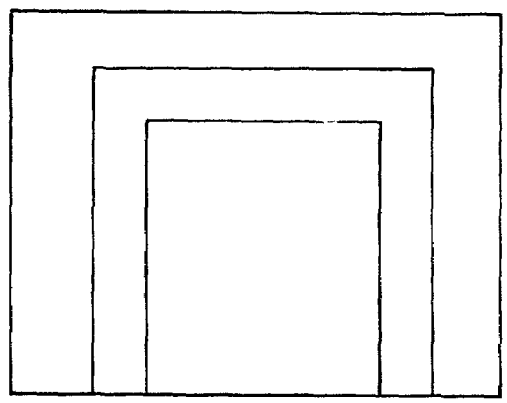
Figure 15D:
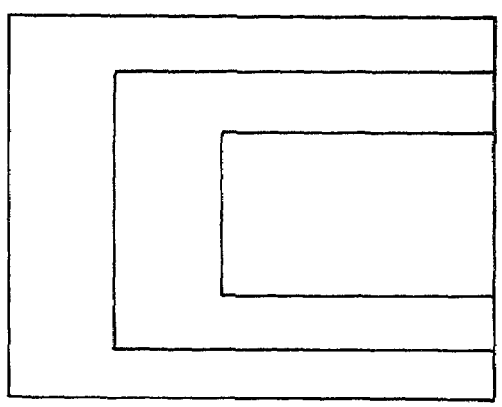
Figure 15E:
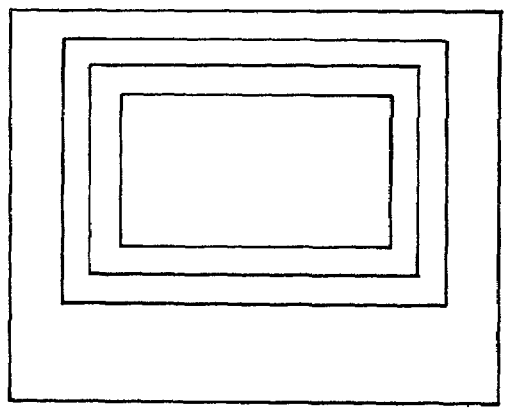
Figure 15F:
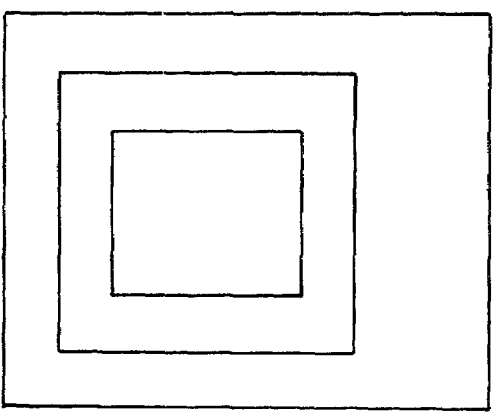

FIGS. 15(A), 15(B), 15(C), 15(D), 15(E) and 15(F) are diagrams showing the composition assist frames 1, 2, 3, 4, 5 and 6, respectively. The composition assist frames 1 and 2 in FIGS. 15(A) and 15(B) are mainly used to shoot a day scene so that the horizon and a horizontal line of a construction are horizontal and a vertical line of a construction is vertical in the pictures.

The composition assist frames 3-6 in FIGS. 15(C)-15(F) are mainly used to shoot persons. The composition assist frames 3 and 5 are used when the user holds the camera upright (the image is wider than it is long), and the composition assist frame 3 is used to shoot one or two persons, and the composition assist frame 5 is used to shoot a group of people. The composition assist frames 4 and 6 are used when the user holds the camera sideways (the image is longer than it is wide).

If one of the composition assist frames 3-6 is used, one or more persons are in the center of a picture. Generally, a lens has a distortion and the periphery of a picture is distorted. However, the persons are not distorted even if the quality of the lens is low. Also, the periphery of the picture may not be printed. For these reasons, the persons should be in the center of the picture.

To display one of the composition assist frames on the liquid crystal monitor 52, the user pushes the display button 5 (see FIG. 1) twice. When the user first pushes the display button 1, a moving image of a subject is displayed on the liquid crystal monitor 52. When the user next pushes the display button 1, the best framing mode is set to display the composition assist frame with the moving image. When the user pushes the display button 1 once more, the liquid crystal monitor 52 is turned off.

When the best framing mode is set, the CPU 38 reads the frame data of the appropriate composition assist frame from the ROM 55 and outputs the frame data to the mixer 51.

The mixer 51 receives the YC signals of the moving image from the memory 36, and mixes the high-luminance frame data with the luminance signals Y of the YC signals to output the mixed signals to the liquid crystal monitor 52, which displays the moving image of the subject and the composition assist frame (white lines).

The method in which the CPU 38 selects the composition assist frame when the best framing mode is set will now be explained.

As shown in FIG. 3, the CPU 38 receives operation signals from the camera control part 40 including the mode dial 1 and the cross key 9 and receives a direction signal from the direction sensor 41 that determines whether the user holds the camera sideways or upright. The CPU 38 determines which one of the day scenic shooting mode, the night scenic shooting mode, the automatic shooting mode and the person shooting mode has been set according to a signal from the mode dial 1, and determines whether the user holds the camera sideways or upright according to the direction signal from the direction sensor 41.

Then, the CPU 38 extracts composition assist frames that can be selected according to the shooting mode and the direction of the camera as shown in the following table 1.

|  | Upright | Sideways |
| --- | --- | --- |
| Day scenic shooting mode or night scenic shooting mode | frames 1, 2 and 3 | frames 1, 2 and 4 |
| Automatic shooting mode | frames 3, 5, 1 and 2 | frames 4, 6, 1 and 2 |
| Person shooting mode | frames 5, 3 and 1 | frames 6, 4 and 1 |

As shown in the table 1, when the shooting mode is the day scenic shooting mode or the night scenic shooting mode and the user holds the camera upright, the composition assist frames 1, 2 and 3 can be selected, and the user selects one of them with the left key and the right key of the cross key 9. The composition assist frame 1 is displayed first, and the composition assist frames 2, 3 and 1 are displayed in that order when the user repeatedly presses the right key. The composition assist frames 3, 2 and 1 are displayed in that order when the user repeatedly presses the left key.

When the shooting mode is the day scenic shooting mode or the night scenic shooting mode and the user holds the camera sideways, the composition assist frames 1, 2 and 4 can be selected, and the user selects one of them with the left key and the right key of the cross key 9.

Figure 16:
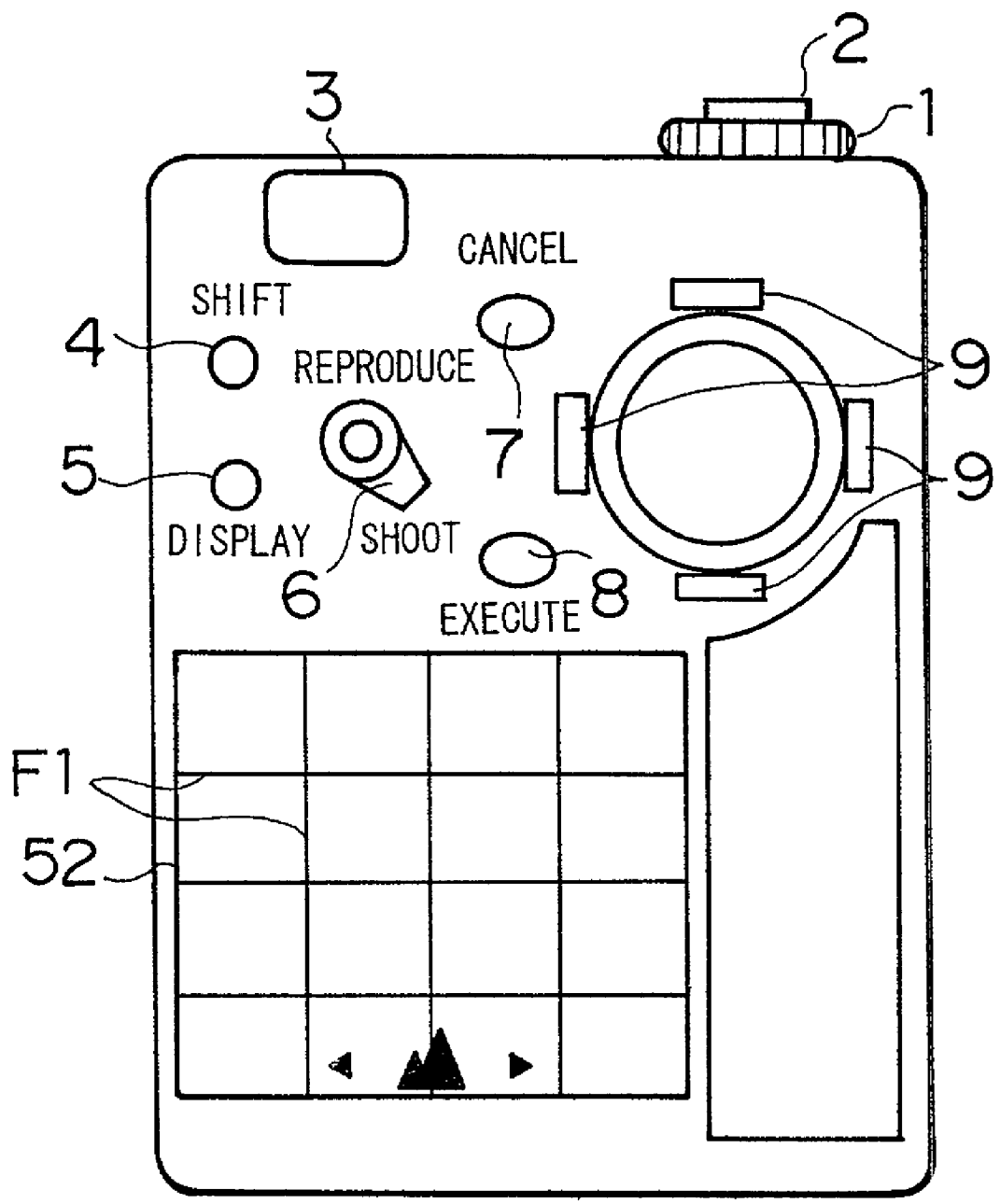
FIG. 16 is a back view of the digital camera displaying a composition assist frame on a liquid crystal monitor in the day scenic shooting mode.
Figure 17:
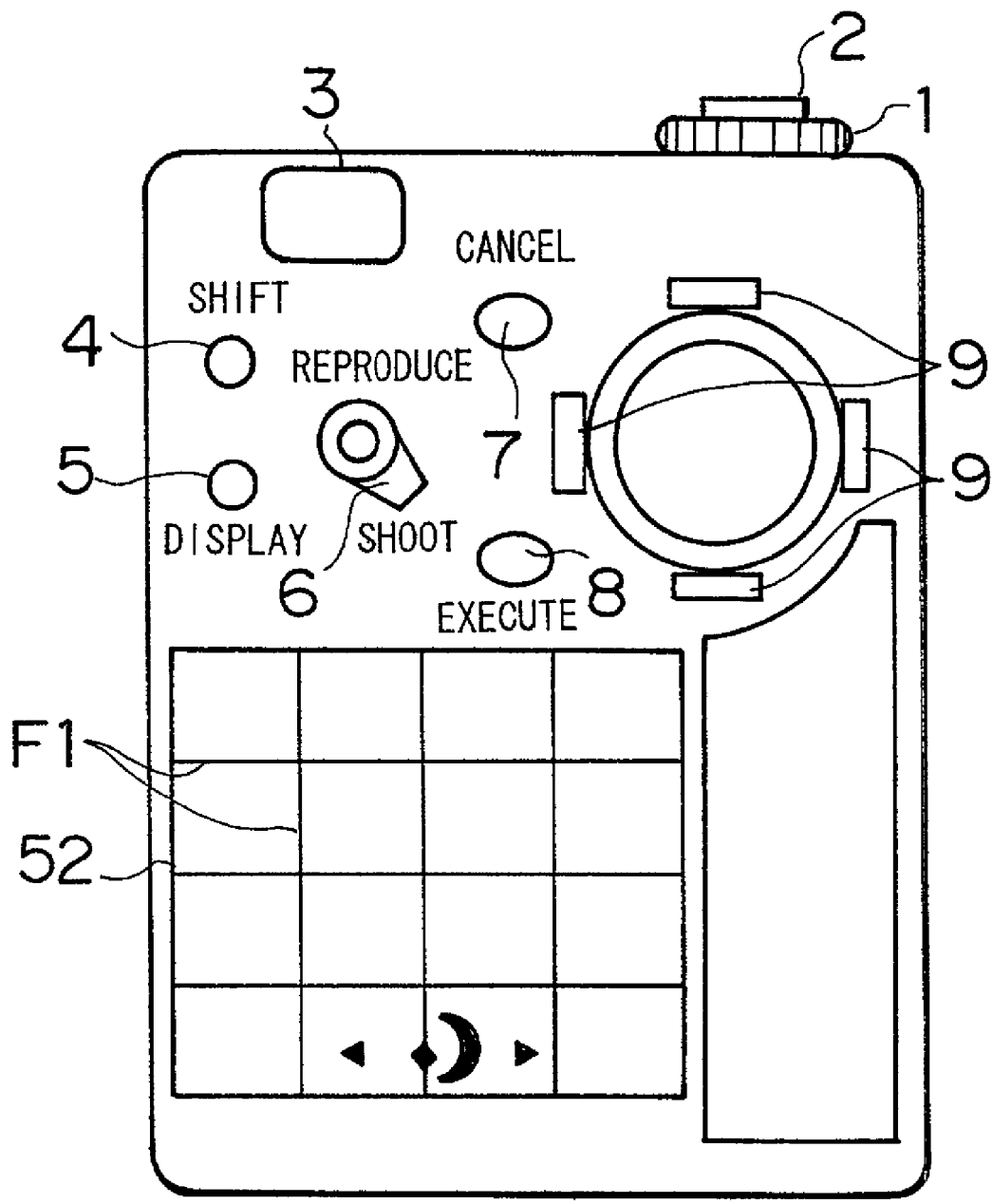
FIG. 17 is a back view of the digital camera displaying the composition assist frame on the liquid crystal monitor in the night scenic shooting mode.

As stated above, when the shooting mode is the day scenic shooting mode or the night scenic shooting mode, the composition assist frames 1 and 2 can be selected regardless of the direction of the camera. The composition assist frame 3 can be also selected when the user holds the camera upright, and the composition assist frame 4 can be also selected when the user holds the camera sideways. FIGS. 16 and 17 are back views of the digital camera displaying the composition assist frame 1 on the liquid crystal monitor 52 in the day scenic shooting mode and the night scenic shooting mode, respectively.

Figure 18:
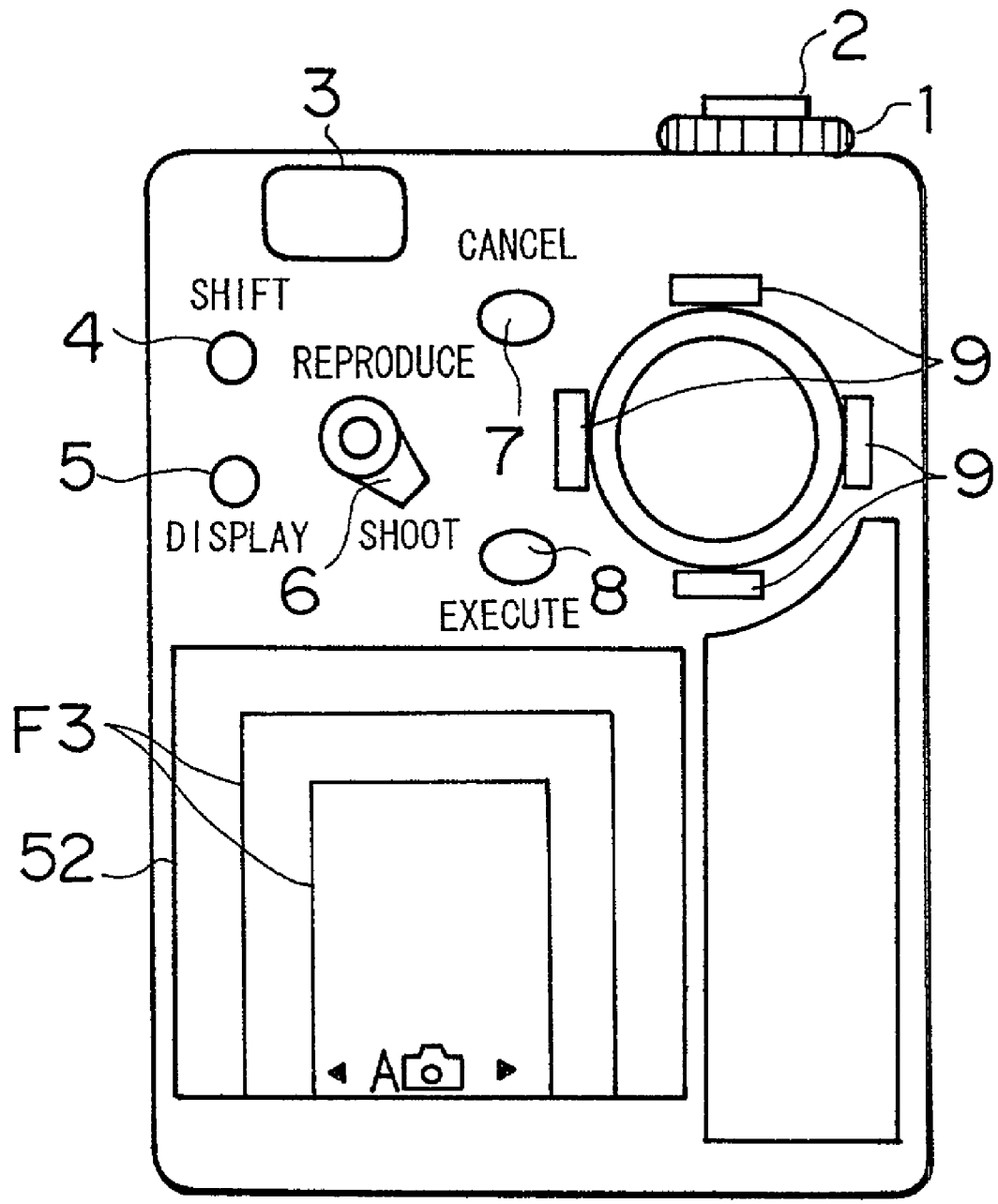
FIG. 18 is a back view of the digital camera displaying a composition assist frame on the liquid crystal monitor in the automatic shooting mode.

When the shooting mode is the automatic shooting mode and the user holds the camera upright, the composition assist frames 3, 5, 1 and 2 can be selected. When the shooting mode is the automatic shooting mode and the user holds the camera sideways, the composition assist frames 4, 6, 1 and 2 can be selected. The composition assist frames 1 and 2 can be selected regardless of the direction of the camera. The composition assist frames 3 and 5 can be also selected when the user holds the camera upright, and the composition assist frames 4 and 6 can be also selected when the user holds the camera sideways. FIG. 18 is a back view of the digital camera displaying the composition assist frame 3 on the liquid crystal monitor 52 in the automatic shooting mode.

Figure 19:
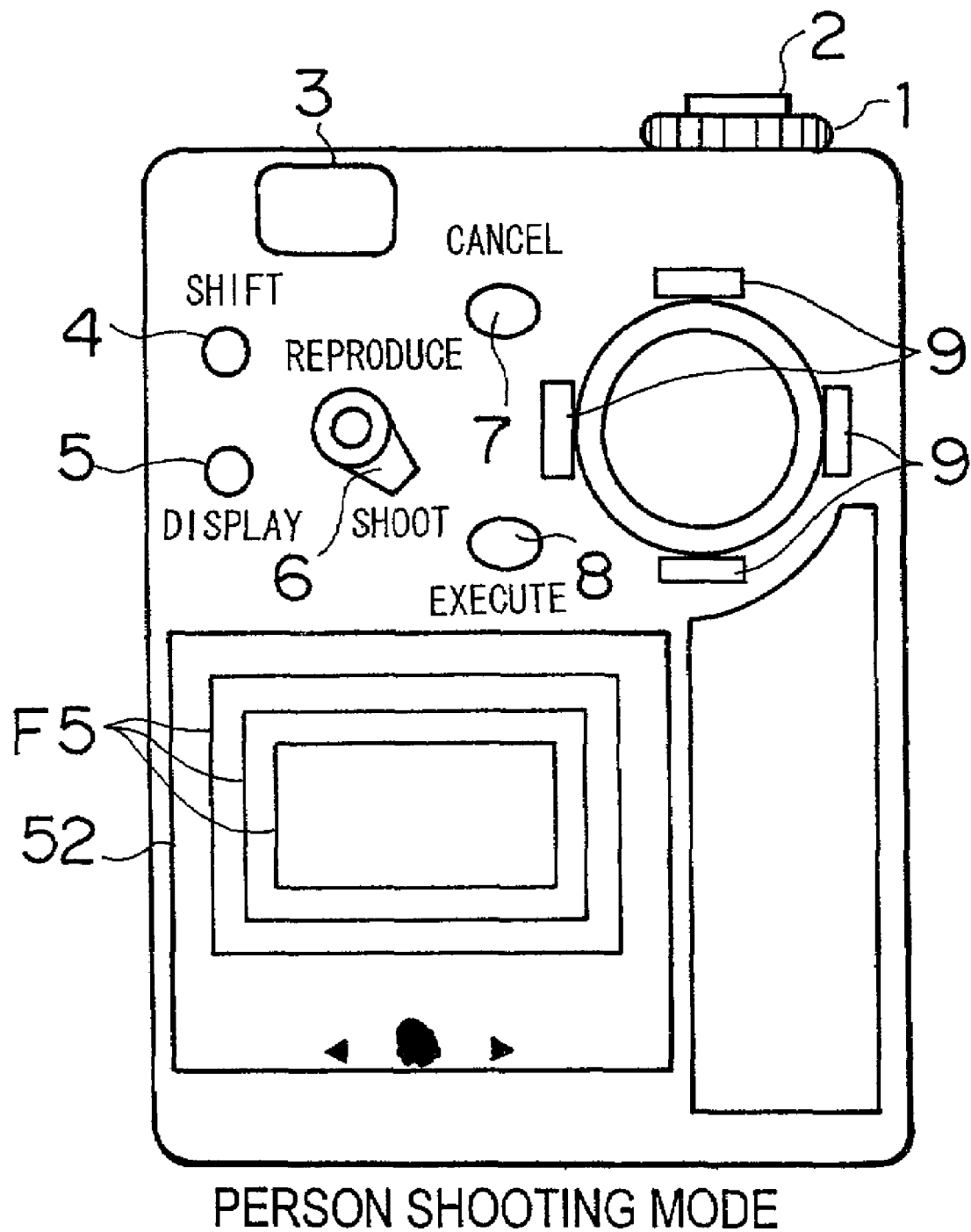
FIG. 19 is a back view of the digital camera displaying a composition assist frame on the liquid crystal monitor in the person shooting mode.

When the shooting mode is the automatic shooting mode and the user holds the camera upright, the composition assist frames 5, 3 and 1 can be selected. When the shooting mode is the automatic shooting mode and the user holds the camera sideways, the composition assist frames 6, 4 and 1 can be selected. The composition assist frame 1 can be selected regardless of the direction of the camera. The composition assist frames 5 and 3 can be also selected when the user holds the camera upright, and the composition assist frames 6 and 4 can be also selected when the user holds the camera sideways. FIG. 19 is a back view of the digital camera displaying the composition assist frame 5 on the liquid crystal monitor 52 in the person shooting mode.

The composition assist frames that can be selected according to the shooting modes and the directions of the camera are not limited to those in the table 1. For example, the composition assist frames 1 and 2 can be selected in case of the day scenic shooting mode or the night scenic shooting mode, and the composition assist frames 5 and 3 can be selected when the shooting mode is the person shooting mode and the user holds the camera upright, and the composition assist frames 6 and 4 can be selected when the shooting mode is the person shooting mode and the user holds the camera sideways. In another example, the composition assist frame 1 can be selected in case of the day scenic shooting mode or the night scenic shooting mode, and the composition assist frame 5 can be selected when the shooting mode is the person shooting mode and the user holds the camera upright, and the composition assist frame 6 can be selected when the shooting mode is the person shooting mode and the user holds the camera sideways. In this case, one composition assist frame is automatically selected according to the shooting mode and the direction of the camera.

The composition assist frames are not limited to those in FIGS. 15(A)-15(F).

The composition assist frames that can be selected are extracted according to the shooting mode and the direction of the camera in the embodiment. However, the composition assist frames may be extracted according to only the shooting mode, and they may be extracted according to only the direction of the camera.

According to the present invention, one or more composition assist frames that can be selected are extracted according to the shooting mode such as the day scenic shooting mode, the night scenic shooting mode and the person shooting mode and the direction of the camera. Therefore, the appropriate composition assist frame can be automatically or easily selected.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A digital camera comprising:
   a shooting mode selecting device that enables selection of a shooting mode from a plurality of shooting modes;
   an imaging device that images a subject in the shooting mode selected by the shooting mode selecting device and outputs image signals;
   an image displaying device that displays the image according to the image signals outputted from the imaging device;
   a storing device that stores data of a plurality of composition assist frames, wherein the storing device stores more than one composition assist frame associated with each of the plurality of shooting modes;
   an extracting device that extracts more than one composition assist frame that can be selected from the plurality of composition assist frames according to the shooting mode selected by the shooting mode selecting device;
   a composition assist frame selecting device that enables selection of a composition assist frame from the more than one composition assist frames extracted by the extracting device; and
   a composition assist frame displaying device that displays the composition assist frame selected by the composition assist frame selecting device on the image displaying device displaying the image.

2. The digital camera as defined in claim 1, wherein the plurality of shooting modes include at least two of an automatic shooting mode, a day scenic shooting mode, a person shooting mode and a night scenic shooting mode.

3. The digital camera as defined in claim 1, further comprising a luminance determining device that determines subject luminance by weighting areas of the image according to the shooting mode selected by the shooting mode selecting device, the imaging device controlling exposure according to the subject luminance determined by the luminance determining device.

4. The digital camera as defined in claim 3, wherein the luminance determining device corrects the subject luminance according to the shooting mode selected by the shooting mode selecting device.

5. The digital camera as defined in claim 1, further comprising a storage device that stores the image signals outputted from the imaging device in a storage medium.

6. A digital camera comprising:
   an imaging device that images a subject and outputs image signals;
   an image displaying device that displays the image according to the image signals outputted from the imaging device;
   a storing device that stores data of a plurality of composition assist frames wherein the storing device stores more than one composition assist frame associated with each of a widthwise direction and a lengthwise direction of the camera;
   a direction determining device that determines whether the digital camera is held in the widthwise direction or the lengthwise direction;
   an extracting device that extracts more than one composition assist frame that can be selected from the plurality of composition assist frames according to the widthwise or lengthwise direction of the camera determined by the direction determining device;
   a composition assist frame selecting device that enables selection of a composition assist frame from the more than one composition assist frames extracted by the extracting device; and
   a composition assist frame displaying device that displays the composition assist frame selected by the composition assist frame selecting device on the image displaying device displaying the image.

7. The digital camera as defined in claim 6, further comprising a storage device that stores the image signals outputted from the imaging device in a storage medium.

8. A digital camera comprising:
   a shooting mode selecting device that enables selection of a shooting mode from a plurality of shooting modes;
   an imaging device that images a subject in the shooting mode selected by the shooting mode selecting device and outputs image signals;
   an image displaying device that displays the image according to the image signals outputted from the imaging device;
   a storing device that stores data of a plurality of composition assist frames wherein the storing device stores more than one composition assist frame associated with each of a widthwise direction and a lengthwise direction of the camera;
   a direction determining device that determines whether the digital camera is held in the widthwise direction or the lengthwise direction;
   an extracting device that extracts more than one composition assist frame that can be selected from the plurality of composition assist frames according to the shooting mode selected by the shooting mode selecting device and the widthwise or lengthwise direction of the camera determined by the direction determining device;

a composition assist frame selecting device that enables selection of a composition assist frame from the more than one composition assist frames extracted by the extracting device; and a composition assist frame displaying device that displays the composition assist frame selected by the composition assist frame selecting device on the image displaying device displaying the image.

9. The digital camera as defined in claim 8, wherein the plurality of shooting modes include at least two of an automatic shooting mode, a day scenic shooting mode, a person shooting mode and a night scenic shooting mode.

10. The digital camera as defined in claim 8, further comprising a luminance determining device that determines subject luminance by weighting areas of the image according to the shooting mode selected by the shooting mode selecting device, the imaging device controlling exposure according to the subject luminance determined by the luminance determining device.

11. The digital camera as defined in claim 10, wherein the luminance determining device corrects the subject luminance according to the shooting mode selected by the shooting mode selecting device.

12. The digital camera as defined in claim 8, further comprising a storage device that stores the image signals outputted from the imaging device in a storage medium.

13. A composition assist frame selecting method for a digital camera, the method comprising:
  enabling selection of a shooting mode from a plurality of shooting modes;
  imaging a subject in the selected shooting mode and outputting image signals;
  displaying the outputted image signals on a display;
  storing data of a plurality of composition assist frames, wherein more than one composition assist frame is associated with each of the plurality of shooting modes;
  extracting more than one composition assist frame that can be selected from the plurality of composition assist frames according to the selected shooting mode;
  enabling selection of a composition assist frame from the extracted more than one composition assist frame; and
  displaying the selected composition assist frame on the display device to assist composition.

14. The composition assist frame selecting method for the digital camera as defined in claim 13, wherein the plurality of shooting modes include at least two of an automatic shooting mode, a day scenic shooting mode, a person shooting mode and a night scenic shooting mode.

15. The method of claim 13, wherein each of the plurality of composition assist frames circumscribes an area within the display.

16. A composition assist frame selecting method for a digital camera, the method comprising:
  imaging a subject and outputting image signals;
  displaying the image on a display according to the outputted image signals;
  storing a plurality of composition assist frames wherein more than one composition assist frame is associated with each of a widthwise direction and a lengthwise direction of the camera;
  determining whether the digital camera is held in the widthwise direction or the lengthwise direction;
  extracting more than one composition assist frame that can be selected from the plurality of composition assist frames according to the determining whether the digital camera is held the widthwise direction or the lengthwise direction;
  enabling selection of a composition assist frame from the more than one extracted composition assist frames; and
  displaying the selected composition assist frame on the display displaying the image to assist composition.

17. A composition assist frame selecting method for a digital camera, the method comprising:
  enabling selection of a shooting mode from a plurality of shooting modes;
  imaging a subject in the selected shooting mode and outputting image signals;
  displaying the image according to the outputted image signals;
  storing data of a plurality of composition assist frames wherein more than one composition assist frame is associated with each of a widthwise direction and a lengthwise direction of the camera;
  determining whether the digital camera is held in the widthwise direction or the lengthwise direction;
  extracting more than one composition assist frame that can be selected from the plurality of composition assist frames according to the selected shooting mode and the determination of whether the digital camera is held widthwise or lengthwise;
  enabling selection of a composition assist frame from the extracted more than one composition assist frames; and
  displaying the selected composition assist frame on the display displaying the image to assist composition.

18. The composition assist frame selecting method for the digital camera as defined in claim 17, wherein the plurality of shooting modes include at least two of an automatic shooting mode, a day scenic shooting mode, a person shooting mode and a night scenic shooting mode.

* * * * *